(12) United States Patent
Chiyoma

(10) Patent No.: US 7,755,053 B2
(45) Date of Patent: Jul. 13, 2010

(54) RADIATION DETECTION APPARATUS

(75) Inventor: Hitoshi Chiyoma, Otawara (JP)

(73) Assignees: Kabushiki Kaisha Toshiba, Tokyo (JP);
Toshiba Electron Tubes & Devices, Co., Ltd., Tochigi-ken (JP)

( * ) Notice: Subject to any disclaimer, the term of this patent is extended or adjusted under 35 U.S.C. 154(b) by 0 days.

(21) Appl. No.: 12/272,498

(22) Filed: Nov. 17, 2008

(65) Prior Publication Data

US 2009/0127466 A1    May 21, 2009

(30) Foreign Application Priority Data

Nov. 19, 2007  (JP) .............................. 2007-298865

(51) Int. Cl.
*G01T 1/20*  (2006.01)
(52) U.S. Cl. ................................. 250/361 R
(58) Field of Classification Search ............. 250/361 R
See application file for complete search history.

(56) References Cited

U.S. PATENT DOCUMENTS

| | | | |
|---|---|---|---|
| 2002/0005490 A1* | 1/2002 | Watanabe | 250/370.09 |
| 2002/0014594 A1* | 2/2002 | Endo | 250/370.09 |
| 2004/0211910 A1* | 10/2004 | Izumi et al. | 250/370.11 |
| 2007/0045553 A1* | 3/2007 | Adachi | 250/370.09 |

FOREIGN PATENT DOCUMENTS

| | | |
|---|---|---|
| JP | 11-284909 | 10/1999 |
| JP | 2002-014168 | 1/2002 |

* cited by examiner

*Primary Examiner*—David P Porta
*Assistant Examiner*—Mindy Vu
(74) *Attorney, Agent, or Firm*—Pillsbury Winthrop Shaw Pittman, LLP

(57) ABSTRACT

A radiation detection apparatus includes a radiation detection panel having a fluorescent film and photoelectric conversion elements, a support board for supporting the radiation detection panel, and a gel member displaced between the radiation detection panel and support board.

4 Claims, 2 Drawing Sheets

US 7,755,053 B2

RADIATION DETECTION APPARATUS

CROSS-REFERENCE TO RELATED APPLICATIONS

This application is based upon and claims the benefit of priority from prior Japanese Patent Application No. 2007-298865, filed Nov. 19, 2007, the entire contents of which are incorporated herein by reference.

BACKGROUND OF THE INVENTION

1. Field of the Invention

The present invention relates to a radiation detection apparatus for detecting radiation.

2. Description of the Related Art

In recent years, there has been practically used a radiation detection apparatus including a fluorescent film for converting radiation especially X-rays into light, and a photoelectric conversion element for converting the light into an electrical signal. Such a radiation detection apparatus can contribute to reduction of size and weight of a radiation detection apparatus itself. The radiation detection apparatus converts image information obtained from radiation passing through an inspection object, into electrical information. The radiation detection apparatus can enjoy convenience provided by digital information processing, such as digital image processing and digital image saving.

The radiation detection apparatus has been widely used for diagnosis and treatment in a medical field including dentists, nondestructive inspection in an industrial field, and structure analysis in scientific studies, for example. Digital information processing enables extraction of high-precision images and high-speed detection of images in each field. Unexpected amount of exposure to radiation can be reduced, and speedy inspection and diagnosis can be realized.

Scintillation material technology is often diverted to a fluorescent film of a radiation detection apparatus. Scintillation material is made of material consisting mainly of Cs and I used for a conventional X-ray image tube. The scintillation material consisting mainly of cesium iodide (hereinafter, CsI) and forming a columnar crystal can increase sensitivity and resolution by an optical guide effect, compared with other scintillation materials forming a particulate crystal.

Further, a conventional X-ray image tube requires electronic lenses in a vacuum tube, and becomes large and heavy. By forming a photodetector having photoelectric conversion elements by thin film elements using amorphous silicon, a two-dimensional thin radiation detection apparatus can be made.

However, a radiation detection panel incorporated in the radiation detection apparatus consists of a photodetector having thin film elements formed on a glass substrate, and a scintillation member formed by a brittle low-strength film such as CsI formed on the photodetector. Thus, a radiation detection panel has a problem with regard to durability when subject to external mechanical stress.

To solve the above problem, Jpn. Pat. Appln. KOKAI Publication No. H11-284909 (FIGS. 1 to 5) discloses the technique to ensure space between a radiation detection panel and a housing by fixing a support base to secure the radiation detection panel and the housing. Also disclosed is the technique to place an elastic member in the housing. With this technique, external pressure can be absorbed by deforming the housing, and pressure applied to the radiation detection panel can be decreased. The above patent document also discloses the technique to arrange a shock absorption member like an air bag in the space between the housing and radiation detection panel, thereby absorbing external pressure.

Further, Jpn. Pat. Appln. KOKAI Publication No. 2002-14168 (FIG. 1) discloses the technique to use an elastic member between a housing and a radiation detection panel, and to use another elastic member between the housing and a support board to secure the radiation detection panel. By the pressing forces of the elastic members, the radiation detection panel secured to the support board is held in the housing.

However, the following problem arises in the prior art described above. The prior art aims at providing a shock absorption effect against external static pressure, and is not effective against dynamic pressure such as vibration and shock.

Namely, in Jpn. Pat. Appln. KOKAI Publication No. H11-284909, the support base to secure the radiation detection panel is fixed to the housing, and impulsive forces such as vibrations and dropping/bumping forces applied to the housing are directly transmitted to the radiation detection panel through the support base. As a result, when a dynamic force is applied to the radiation detection panel, mechanical damage is easily produced in the radiation detection panel.

In Jpn. Pat. Appln. KOKAI Publication No. 2002-14168, the elastic members are used between the housing and the support board and between the housing and the radiation detection panel. Therefore, impulsive forces such as vibrations and dropping/bumping forces applied to the housing are not directly transmitted to the radiation detection panel. However, external shock such as vibrations and dropping/bumping forces is applied as an inertial force to the support board and radiation detection panel. If the inertial force exceeds the shock absorption capacity of the elastic members, the radiation detection panel suffers a mechanical damage.

An inertial force is proportional to the mass of a substance. In a conventional example in which the radiation detection panel is secured to the support board, an inertial force is proportional to the sum of the mass of the radiation detection panel and support board. The radiation detection panel usually uses a thin glass substrate with a thickness of approximately 0.7 mm as a base member. The support board to support the glass substrate needs to be made of a rigid metallic material. In a radiation detection panel, it is further necessary to stick a lead plate to the back of the support board. The lead plate functions as an X-ray insulator for a circuit arranged on the rear side of the support board. Thus, the mass of the support board is inevitably increased to much larger than the glass substrate, and the sum of the mass of the radiation panel and support board is increased, and the inertial force is increased. This causes a problem that the inertial force exceeds the capacity of the elastic member as a shock absorption member.

BRIEF SUMMARY OF THE INVENTION

The present invention has been made in order to solve the above problem. Accordingly, it is an object of the invention is to provide a radiation detection apparatus, which increases the reliability of a radiation detection apparatus, particularly the reliability against impulsive forces such as vibrations and dropping/bumping forces.

To achieve the object, according to an aspect of the present invention, there is provided a radiation detection apparatus comprising:

a radiation detection panel having a fluorescent film and photoelectric conversion elements;

a support board for supporting the radiation detection panel; and a gel member displaced between the radiation detection panel and support board.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment of the present invention will be explained with reference to the accompanying drawings.

Figure 1:
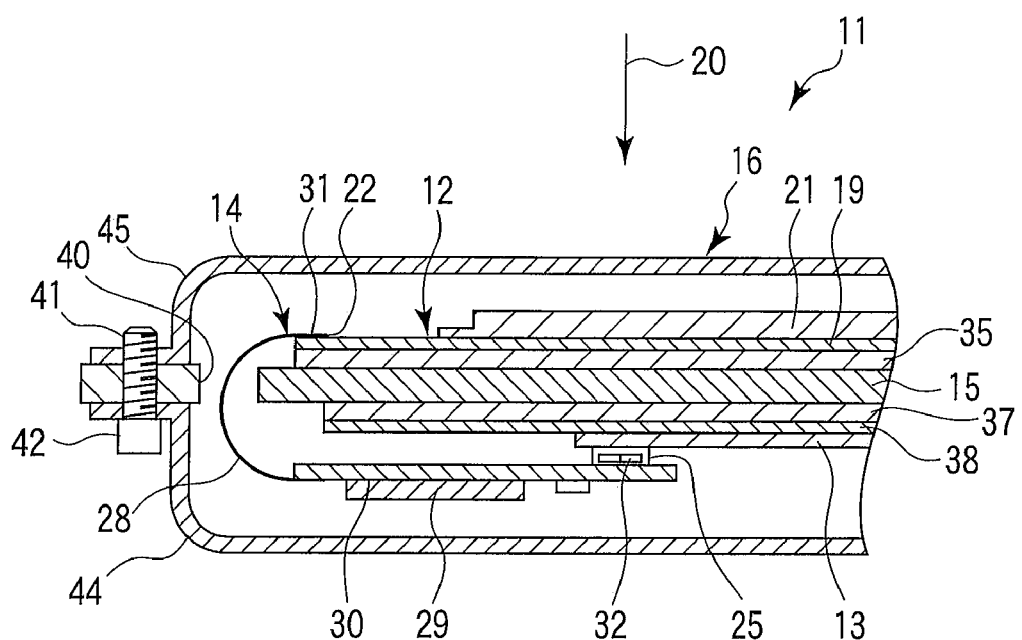
FIG. 1 is a sectional view of a part of an X-ray detection apparatus according to an embodiment of the invention.

FIG. 1 is a sectional view of a part of an X-ray detection apparatus 11 as a radiation detection apparatus. The X-ray detection apparatus 11 comprises an X-ray detection panel 12 as a radiation detection panel, a circuit board 13, a connection board 14, a support board 15, and a housing 16. The circuit board 13 electronically drives the X-ray detection panel 12, and electronically processes an output signal from the X-ray detection panel 12. The connection board 14 connects the X-ray detection panel 12 to the circuit board 13. The support board 15 supports the X-ray detection panel 12 and circuit board 13. The housing 16 contains X-ray detection panel 12, circuit board 13, connection board 14, and support board 15.

Figure 3:
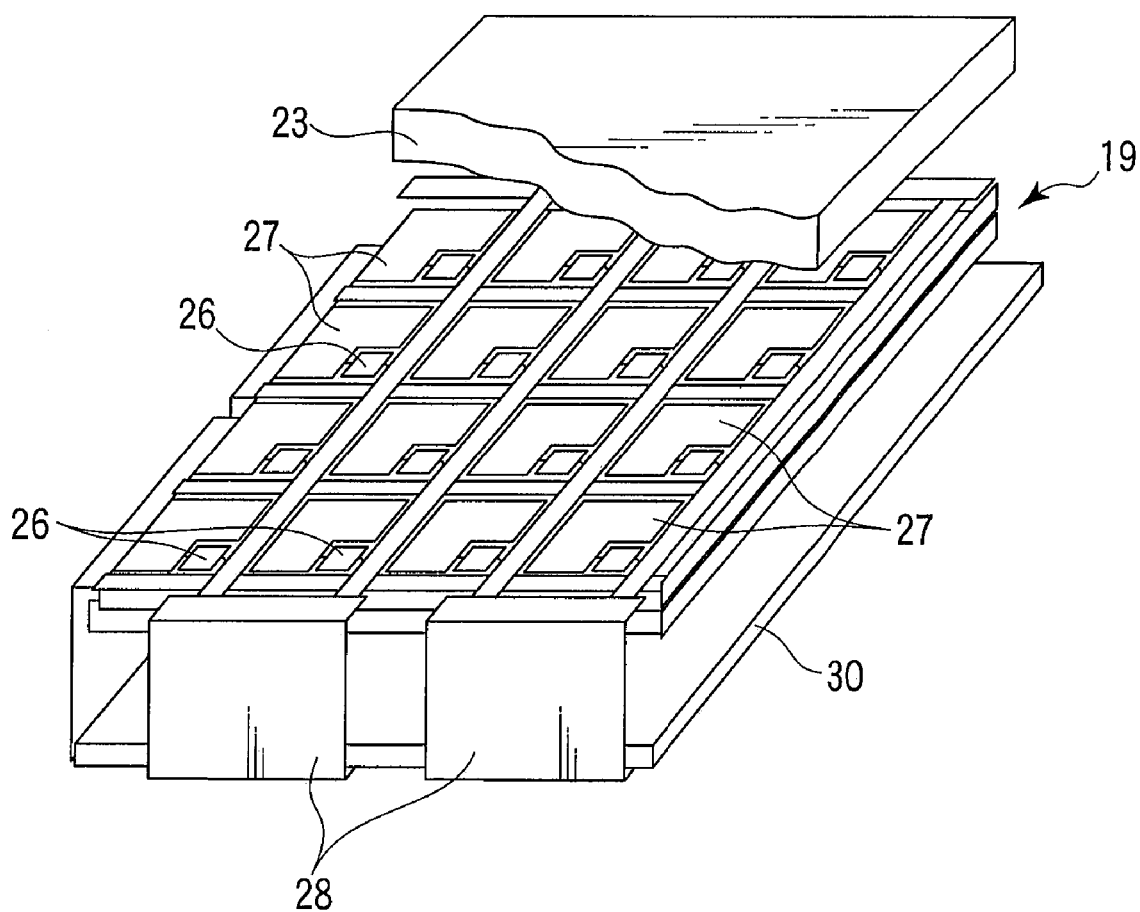
FIG. 3 is an exploded perspective showing a part of the X-ray detection apparatus, particularly a view of the X-ray detection panel partly broken away.

FIG. 3 shows thin-film transistors (TFTs) 26, photodiodes (PDs) 27, and a fluorescent film 23. The X-ray detection panel 12 has a photodetector 19, a fluorescent film 23, and a moisture-proof cover 21. On the incident side of X-rays 20, the fluorescent film 23 is formed on the photodetector 19. The moisture-proof cover 21 covers the fluorescent film 23, and is sealed to the fluorescent film 23.

The photodetector 19 is formed on a 0.7-mm-thick glass substrate, forming TFTs 26 and PDs 27 as photoelectric conversion elements. The TFTs 26 and PDs 27 are made of amorphous silicon (a-Si) as a base material. The outer periphery of the photodetector 19 has a plurality of terminal pad 22 for making connection with the outside. The terminal pads 22 are used to input an electrical signal for driving the photodetector 19, and to output an output signal.

The fluorescent film 23 is made of Tl-added CsI, and formed with a thickness of 500 μm on the photodetector 19 by evaporation. The fluorescent film 23 is formed like a film. The thickness of the fluorescent film 23 is set to 100 to 1000 μm for the X-ray detection apparatus 11. More preferably, the thickness of the fluorescent film 23 is set to 200 to 800 μm by taking into account desired sensitivity and image resolution.

The thickness of the moisture-proof cover 21 is desirably as small as possible. A thick cover attenuates X-rays, and decreases the sensitivity. Actually, the thickness of the moisture-proof cover 21 is selected in a range of 50 to 500 μm, considering the balance of stability of form, durability against processing and attenuation of X-rays. The moisture-proof cover 21 is made of Al alloy with a thickness of 200 μm, for example.

As described above, the X-ray detection panel 12 is formed by stacking thin members. As a result, the X-ray detection panel 12 is made light and not rigid, and needs to be supported by the support board 15 as a holding mechanism.

The circuit board 13 electrically drives the photodetector 19, and electrically processes the output signal from the photodetector 19. The outer periphery of the circuit board 13 is provided with a connector 25 for making electrical connection with the connection board 14.

The connection board 14 comprises a flexible circuit board 28 with only traces formed thereon, and an IC-mounted substrate 30 with an integrated circuit semiconductor element 29 mounted thereon. The connection board 14 is formed by connecting one end side of the flexible circuit board 28 to one end side of the IC-mounted substrate 30.

The flexible circuit board 28 has a wiring pattern made of a Cu film on a polyimide film, for example. The flexible circuit board 28 is a flexible circuit board with an excellent flexibility. The wiring pattern is exposed on the distal end side, or the other end side of the flexible circuit board 28, and a connection part 31 is formed in the exposed part. The connection part 31 ensures stable electrical connection, and is coated with gold plating in the exposed part. The connection part 31 of the flexible circuit board 28 is connected to the terminal pad 22 of the photodetector 19. The connection part 31 and terminal pad 22 are connected by a thermocompression bonding method using an anisotropic conductive film (ACF). This method ensures electrical connection of fine signal wires.

The IC-mounted substrate 30 is a rigid multi-layer wiring substrate formed by stacking Cu films on a glass epoxy member. The integrated circuit semiconductor element 29 is situated on one side of the IC-mounted substrate 30. One end side of the flexible circuit board 28 is connected to one side of the IC-mounted substrate 30. A connector 32 is provided on the other side of the IC-mounted substrate 30. The connector 32 is electrically connected to the connector 25 of the circuit board 13. As the integrated circuit semiconductor element 29, a photodetector driving integrated circuit semiconductor element for electrical driving of the photodetector 19, and a signal detection integrated circuit semiconductor element for processing an output signal from the photodetector 19 are used.

The support board 15 is made of Al alloy, for example. The support board 15 is rigid and flat adequately for holding the X-ray detection panel 12. The support board 15 also has a function of supporting the circuit board 13 and housing 16.

On one side of the support board 15, the photodetector 19 of the X-ray detection panel 12 is fixed through a gel sheet 35 as a gel member. The gel sheet 35 is formed like a sheet. The gel sheet 35 is made of urethane or silicone material, and has a thickness of approximately 3 mm.

The gel sheet 35 is available in a sticky type and a non-sticky type. A sticky gel sheet can fix the X-ray detection panel 12 to the support board 15 by virtue of its stickiness. In this case, the gel sheet 35 fixes the X-ray detection panel 12 by its entire face, and stably holds the X-ray detection panel 12. If a non-sticky gel sheet 35 is used, a fixing part is necessary to mechanically press the X-ray detection panel 12 to the support board 15. For example, an elastic member such as a spring may be used as the fixing part to fix the X-ray detection panel 12. In this case, a gel member is used also between the fixing part and X-ray detection panel 12, and the X-ray detection panel 12 is held through the upper and lower gel members. This improves resistance to vibration and shock.

On the other side of the support board 15, the circuit board 13 is provided through an X-ray shielding lead plate 37 and a radiating insulation sheet 38. The circuit board 13 is fixed with a screw.

In the area close to the outer periphery of the support board 15, an opening 40 is formed for passing the flexible circuit board 28 of the connection board 14 for connecting the photodetector 19 of the X-ray detection panel 12 to the circuit board 13. A fixing hole 41 is formed at the corner of the support board 15.

The housing 16 has cover parts 44 and 45. The peripheral edge portion of the support board 15 is held between the peripheral edge portions of the cover parts 44 and 45. The peripheral edge portions of the cover parts 44 and 45 are secured to the peripheral edge portion of the support board 15 with a fixing member 42. The fixing member 42 is a screw for example to be inserted into the fixing hole 41, and tightened. The fixing member 42 may be a bolt inserted into the fixing hole 41, and a nut.

As described above, the X-ray detection panel 12 is formed by stacking thin members, and has the mass lighter than the support board 15. The support board 15 is required to be rigid, and often uses a thick metallic plate as a base member. The support board 15 is also provided with a lead plate 37. Thus, the mass of the support board 15 including the lead plate 37 is greatly increased by the X-ray detection panel 12.

The gel sheet 35 is placed between the X-ray detection panel 12 and support board 15. Therefore, the X-ray detection panel 12 can be dynamically separated from the support board 15.

Figure 2:
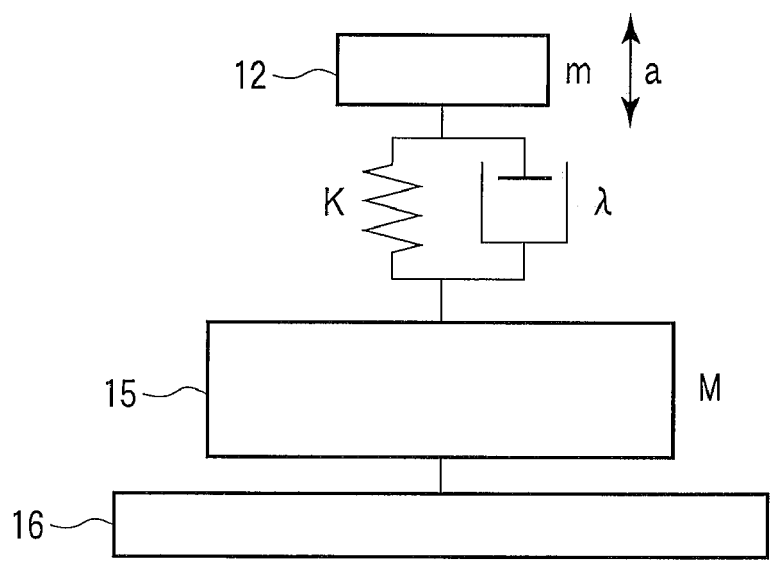
FIG. 2 is a schematic diagram showing a dynamic relationship between an X-ray detection panel, a support board, and a housing of the X-ray detection apparatus.

FIG. 2 is a schematic diagram showing a dynamic relationship between the X-ray detection panel 12, support board 15 and housing 16. The mass m of the X-ray detection panel 12 is sufficiently smaller than the mass M of the support board 15. The gel sheet 35 placed between X-ray detection panel 12 and support board 15 is diagrammatically indicated by an elastic coefficient K and an attenuation resistance λ. The gel sheet 35 originally has a plastic deformable element, but it is omitted in the drawing.

The effects of this embodiment will be explained by using this schematic diagram.

An external force f such as vibration is applied to the X-ray detection panel 12 as an acceleration a, and is expressed by the following well-known equation.

$$f = m \times a$$

As the mass m of the X-ray detection panel 12 is small, the gel sheet 35 can absorb the force f applied to the X-ray detection panel 12 by its elastic force and attenuation force.

A shock imparted to the housing 16 and support board 15 is applied to the support board 15 as a sudden momentum change, which is a so-called impulsive force. However, as for the X-ray detection panel 12, the momentum change and impulsive energy caused by the above shock are absorbed by the elastic force and attenuation force of the gel sheet 35. Further, the gel sheet 35 can also disperse external local stress applied to the support board 15. According to the above description, the gel sheet 35 can decrease an ill effect to the X-ray detection panel 12.

As explained herein, by placing the gel sheet 35 between the X-ray detection panel 12 and support board 15, it is possible to increase the reliability of the X-ray detection apparatus 11, particularly the reliability to impulsive forces such as vibration, collision, and dropping.

The invention is not limited to the embodiment described above. The invention may be embodied by modifying the constituent elements in a practical stage without departing from its essential characteristics. The invention may be embodied in other specific forms by appropriately combining the components disclosed in the embodiment described above. For example, some components may be deleted from all components indicated in the embodiment.

For example, the invention is not limited to an X-ray detection apparatus, and may be applied to any radiation detection apparatus.

What is claimed is:

1. A radiation detection apparatus comprising:
   a radiation detection panel having a fluorescent film and photoelectric conversion elements;
   a circuit board which electronically drives the radiation detection panel;
   a support board for supporting the radiation detection panel and circuit board;
   a housing which contains the radiation detection panel, circuit board, and support board, and is held by the support board; and
   a gel member which is placed between the radiation detection panel and support board, and absorbs external force applied to the radiation detection panel by elastic force and attenuation force of the gel member.

2. The radiation detection apparatus according to claim 1, wherein the gel member is formed like a sheet.

3. The radiation detection apparatus according to claim 2, wherein the gel member is sticky.

4. The radiation detection apparatus according to claim 1, wherein the gel member is sticky.

* * * * *